H. C. CAGE.
COTTON-CLEANER.

No. 184,333.                    Patented Nov. 14, 1876.

Witnesses
Grenville Lewis
M. Church

Inventor
Henry C. Cage
By Hill, Ellmott & Spear
His Attys.

UNITED STATES PATENT OFFICE.

HENRY C. CAGE, OF BROWNSVILLE, TENNESSEE.

IMPROVEMENT IN COTTON-CLEANERS.

Specification forming part of Letters Patent No. 184,333, dated November 14, 1876; application filed September 19, 1876.

*To all whom it may concern:*

Be it known that I, HENRY C. CAGE, of Brownsville, in the county of Haywood and State of Tennessee, have invented a new and useful Improvement in Cotton-Cleaners; and I do hereby declare the following to be a full, clear, and exact description of the same, reference being had to the accompanying drawings, forming part of this specification.

My invention relates to machines for cleaning cotton, both in pod or ball and in the lint— *i. e.*, either before or after ginning separating the trash, dust, and dirt from the cotton— without injuring the staple.

The details of construction I proceed fully and particularly to describe, and point out in the claims the special improvement I have made.

Figure 1:
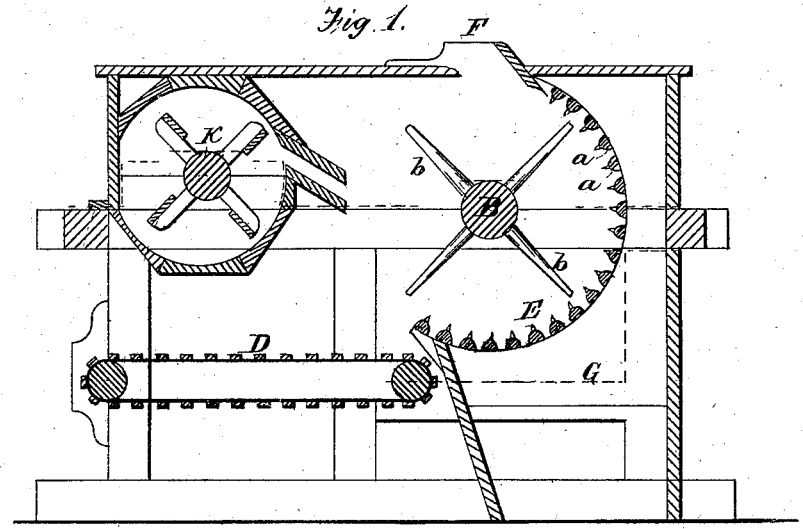
Figure 2:
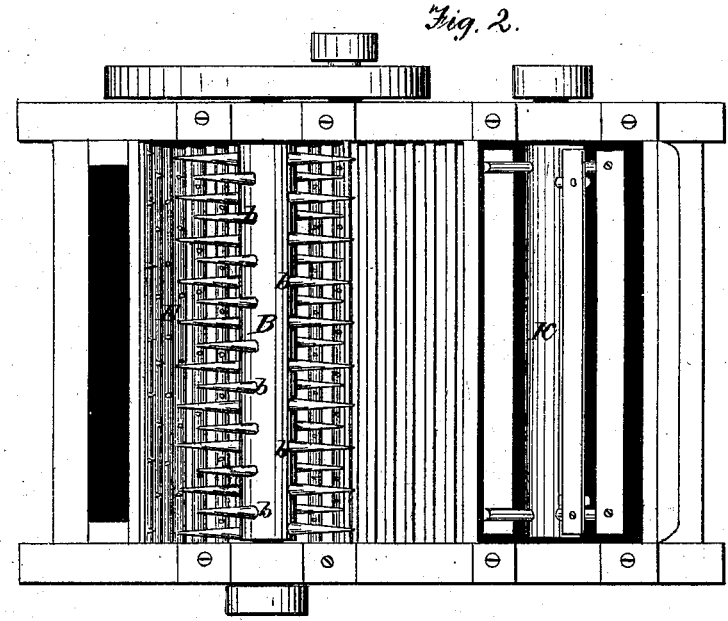

In the accompanying drawings, Figure 1 represents a vertical section and side view of the machine embracing my invention, which cut represents only one armed shaft, one concave, and one fan. Fig. 2 represents a top view, with the cap removed to show the position of each and all the different parts one to the other.

Within a frame, A, is arranged one or more concaves, E, consisting of thin slats of wood or wire, with narrow spaces between them, (shown at *a a*,) being secured at the ends and middle supports in the frame. One or more shafts, B, having arms *b b*, are arranged with bearings in the frame to revolve within the concave, and the arms *b* being set into the shaft in straight lines, and all of the same length, thereby striking the cotton squarely and straight forward, moving the cotton all the time in the same direction, thus obviating the entanglement and twisting of the staple. The cotton is fed to the cylinder by means of a hopper, F, in top of cap, and is taken around the concave, while at the same time the action of the fan against it renovates and cleans out the dust and dirt, which is driven through the open or slotted concave E into the dust-chamber G. The fan (marked in the drawing K) is placed in front of the beater-shaft, the exit-orifice being arranged a little below it, so that the force of the air is directed against the material, and the action of the air is in opposition to that of the arms on the shaft. The clean cotton passes out, and is conveyed off by means of an apron, D, which is also slotted or perforated, thereby giving a continued outlet for all dirt and dust throughout the whole process. In the concave I have arranged every four or five inches apart a strong slat of metal or wood, studded thickly with short pins, which retard the too hasty passage of cotton from cylinder without danger of clogging or choking. The shaft or shafts are driven by means of a pulley on one end, also the fan plied in same way, with the apron D upon rollers, and the shaft-arms are of either metal or wood. The concave or concaves may be of such dimensions as will be found best adapted to perform the functions and produce the desired results.

I claim as my invention—

1. In a cotton-cleaner, the combination of the concave E, formed of slats set with sharp studs, of a shaft with beater-arms thereon, and of a hopper for the admission of the cotton, said parts being arranged in the described relation to a fan, having its exit directed to the beater, and a little below its shaft, as set forth.

2. The combination of the concave E, with its hopper and beater-arms, the fan having its exit below the shaft of said beater-arms, and the conveyer D, the parts being arranged in relation to each other, and operating as set forth.

H. C. CAGE.

Witnesses:
J. R. DANN,
JAS. A. DUPREE.